United States Patent
Park et al.

(10) Patent No.: US 8,058,992 B2
(45) Date of Patent: Nov. 15, 2011

(54) APPARATUS AND METHOD FOR TRACKING INDOOR TARGET USING WIRELESS DISTANCE MEASURING TECHNOLOGY

(75) Inventors: Sung-Kweon Park, Suwon-si (KR); Do-Young Ha, Seongnam-si (KR); Yun-Je Oh, Yongin-si (KR); Joon-Oo Kim, Suwon-si (KR)

(73) Assignee: Samsung Electronics Co., Ltd., Maetan-dong, Yeongtong-gu, Suwon-si, Gyeonggi-do (KR)

( * ) Notice: Subject to any disclaimer, the term of this patent is extended or adjusted under 35 U.S.C. 154(b) by 366 days.

(21) Appl. No.: 12/350,392

(22) Filed: Jan. 8, 2009

(65) Prior Publication Data
US 2009/0174549 A1    Jul. 9, 2009

(30) Foreign Application Priority Data
Jan. 9, 2008   (KR) .................. 10-2008-0002617

(51) Int. Cl.
*G08B 1/08*   (2006.01)
(52) U.S. Cl. ................. 340/539.3; 340/539.13
(58) Field of Classification Search ............ 340/539.3, 340/539.13, 539.15, 539.32, 573.4; 324/329; 342/146
See application file for complete search history.

(56) References Cited

U.S. PATENT DOCUMENTS

| | | | |
|---|---|---|---|
| 7,148,802 B2 * | 12/2006 | Abbruscato | 340/539.13 |
| 7,397,366 B2 * | 7/2008 | Kampel | 340/539.13 |
| 2006/0012476 A1 * | 1/2006 | Markhovsky et al. | 340/539.32 |
| 2009/0098907 A1 * | 4/2009 | Huntzicker et al. | 340/539.13 |

* cited by examiner

*Primary Examiner* — John A Tweel, Jr.
(74) *Attorney, Agent, or Firm* — Cha & Reiter, LLC

(57) ABSTRACT

A method and system for sensorless tracking of an indoor target using a wireless distance measuring technology. A location tracking apparatus is initially moved, and then it is determined whether or not an initial traveling direction of the location tracking apparatus is forward or backward with respect to the target. A minimum distance between the location tracking apparatus and the target during the movement is determined, the minimum distance is stored, and the location tracking apparatus is moved to a location corresponding to the minimum distance, where it is determined whether the location tracking apparatus is directed forward or backward with respect to the target at the location corresponding to the minimum distance. The location tracking apparatus is then moved to the target.

14 Claims, 3 Drawing Sheets

APPARATUS AND METHOD FOR TRACKING INDOOR TARGET USING WIRELESS DISTANCE MEASURING TECHNOLOGY

CLAIM OF PRIORITY

This application claims the benefit under 35 U.S.C. §119(a) of a Korean Patent Application filed in the Korean Intellectual Property Office on Jan. 9, 2008 and assigned Serial No. 10-2008-2617, the entire disclosure of which is hereby incorporated by reference in its entirety.

BACKGROUND OF THE INVENTION

1. Field of the Invention

The present invention generally relates to a distance measuring technology. More particularly, the present invention relates to an apparatus and method for tracking a fixed target without using equipment such as a plurality of fixed reference nodes by a mobile system under an indoor wireless environment.

2. Description of the Related Art

Ubiquitous computing is a concept of building a space in which all entities and objects are intellectualized, connected to an electronic space, and are able to exchange information with one another by adding a computing function to every physical space and object including roads, bridges, tunnels, buildings, building walls, etc.

The basic premise upon which ubiquitous computing was founded is that all computers are connected to one another, are available to users at any time in any place, though invisible to the users, and are integrated into their daily livings in a real world. A core infrastructure to realize this ubiquitous environment, ubiquitous network is an information communication network that is accessible to anyone irrespective of time and place without any constraints of communication speed or the like and can distribute every information and content.

Owing to the realization of the ubiquitous network, users can expect to enjoy information communication services freely without many limitations encountered with legacy information communication networks and services. Especially, for example, a community that goes beyond time and space can be formed by use of the ubiquitous network and various sensors and the contexts and locations of people and objects can be known through the community.

The proliferation of ubiquitous computing and the ubiquitous network will create new, diverse services that may include a ubiquitous location-based application service for locating persons and objects anytime anywhere. The provision of such a useful service based on the locations of people and objects is emerging as a significant factor in further developing the ubiquitous environment.

Location awareness technology for acquiring information about the current location of a user is a basic technology that is a priority in terms of support in order to realize the ubiquitous computing that autonomously recognizes the situation of a user anytime anywhere, and provides a service suitable for the situation to the user. Active research is underway on the location awareness technology in many countries.

For location awareness, there are a Global Positioning System (GPS)—or mobile communication Base Station (BS)-based tracking technology, a location referencing technology using milestones, spots, directions, distances, etc. and a numerical map technology based on topology, scale conversion, or format conversion. However, these location awareness technologies have a shortcoming in that they were developed for outdoor use, and thus are not applicable to an indoor environment for accurate positioning. Accordingly, location awareness technologies have been developed separately for location awareness in an indoor environment.

An indoor location system, such as a wireless communication, infrared, or ultrasonic, requires installation of a predetermined number of fixed reference nodes. The reference nodes have absolute coordinates or relative coordinates with respect to a single node, and are preliminarily entered in order to determine the relative coordinates of a target mobile tag node. The coordinates of the mobile tag node are calculated using distances measured by bi-directional communications between the mobile tag node and the fixed reference nodes. Each node in the system has its specific clock value, a transmission time is estimated by exchanging the specific values, and then the distance between nodes is measured using a transmission time in the wireless communication, infrared, or ultrasonic location system.

FIG. 1 illustrates a conventional method for tracking the location of a target object indoors by infrared rays. Referring to FIG. 1, magnetic north (N) is determined using a magnetic sensor, or an electronic compass, and the azimuth angle between a target and the magnetic north is determined using a rotational antenna or rotating infrared beams. Then the distance (d) between a location tracking apparatus and the target is determined by measuring the Time of Arrival (ToA) of a signal at the target or measuring the Received Signal Strength (RSS) of a signal received from the target. The target is tracked down in the shorted route based on the azimuth angle and the distance.

However, there are problems associated with the above tracking method, which typically tracks a target using infrared rays, ultrasonic waves, or electromagnetic waves, as it suffers from interference due to ambient sun rays or a nearby light in the case of infrared distance measurement, a long time delay in the case of an ultrasonic technology, and a distance measurement accuracy of 3 m or longer (i.e. difficulties in accurate distance measurement in the case of electromagnetic-based RSS detection).

Moreover, the conventional indoor location system has a higher installation costs because of the requirement of a plurality of fixed reference nodes, a sensor system, and a server system for indoor positioning. The conventional target tracking system also has the disadvantages of the use of large amounts of equipment for everyday operation. Moreover, the higher costs further include costs for a phase array antenna or a motor-rotated antenna to acquire information about the distance and azimuth angle between a location tracking apparatus because the conventional receives angle information through phase-array or motor-rotated antenna. In addition a target and the need for a magnetic sensor or an accurate compass to obtain information about a reference direction further complicates installation and increases associated costs.

Tracking the location of a target in the conventional systems is also limited to a very confined area or takes a lot of equipment and cost. Accordingly, there exists a need for tracking a fixed target using minimum system resources in an indoor environment.

SUMMARY OF THE INVENTION

An aspect of exemplary embodiments of the present invention is to provide a method for approaching a fixed target directly using two accurate wireless distance measurers without using reference nodes or a sensor system that is conventionally used for indoor target tracking. The present invention provides a novel and non-obvious method for tracking a fixed target using minimum system resources without using fixed nodes in an indoor environment.

In accordance with an exemplary aspect of the present invention, there is provided a method for tracking an indoor target using a wireless distance measuring technology, in which a location tracking apparatus is initially moved. According to the method, there is a determination as to whether an initial traveling direction of the location tracking apparatus is forward or backward with respect to the target; a minimum distance between the location tracking apparatus and the target during the movement is determined; and the minimum distance is stored. The location tracking apparatus is moved to a location corresponding to the minimum distance, it is determined whether the location tracking apparatus is directed forward or backward with respect to the target at the location corresponding to the minimum distance, and the location tracking apparatus is then moved to the target.

In accordance with another exemplary aspect of the present invention, there is provided a system for tracking an indoor target using a wireless distance measuring technology, in which a location tracking apparatus tracks a location of a fixed tag using distances between a mobile tag and the fixed tag, and the distances being stored in the order of time, and a target has the fixed tag attached thereto.

BRIEF DESCRIPTION OF THE DRAWINGS

The above features and advantages of certain exemplary embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION

The matters defined in the description, such as a detailed construction and elements, are provided to assist in a comprehensive understanding of exemplary embodiments of the invention by a person of ordinary skill in the art. Accordingly, those of ordinary skill in the art will recognize that various changes and modifications of the embodiment described herein can be made without departing from the scope and spirit of the invention. Also, descriptions of well-known functions and constructions are omitted for clarity and conciseness.

As described in the aforementioned description of the art, the conventional indoor location system is associated with high costs because of the requirement of a plurality of fixed reference nodes, a sensor system, and a server system for indoor positioning. The conventional target tracking system also has the disadvantages of the need to use of lots of equipment and a high cost because it receives angle information through a phase array antenna or a motor-rotated antenna to acquire information about the distance and azimuth angle between a location tracking apparatus and a target and needs a magnetic sensor or an accurate compass to obtain information about a reference direction.

The present invention, for example, can be comprised of three components. Namely the components include: (1) a fixed tag attached to a fixed target such as a parked car or a robot paging remote controller, (2) a location tracking apparatus for performing logical computations with mobility, such as a portable terminal or a robot, and (3) a mobile tag attached to the location tracking apparatus.

Wireless distance measurers are provided in the fixed tag and the mobile tag. They measure the distance between the fixed tag and the mobile tag by measuring the Time of Arrival (ToA) of signals between them.

Figure 1:
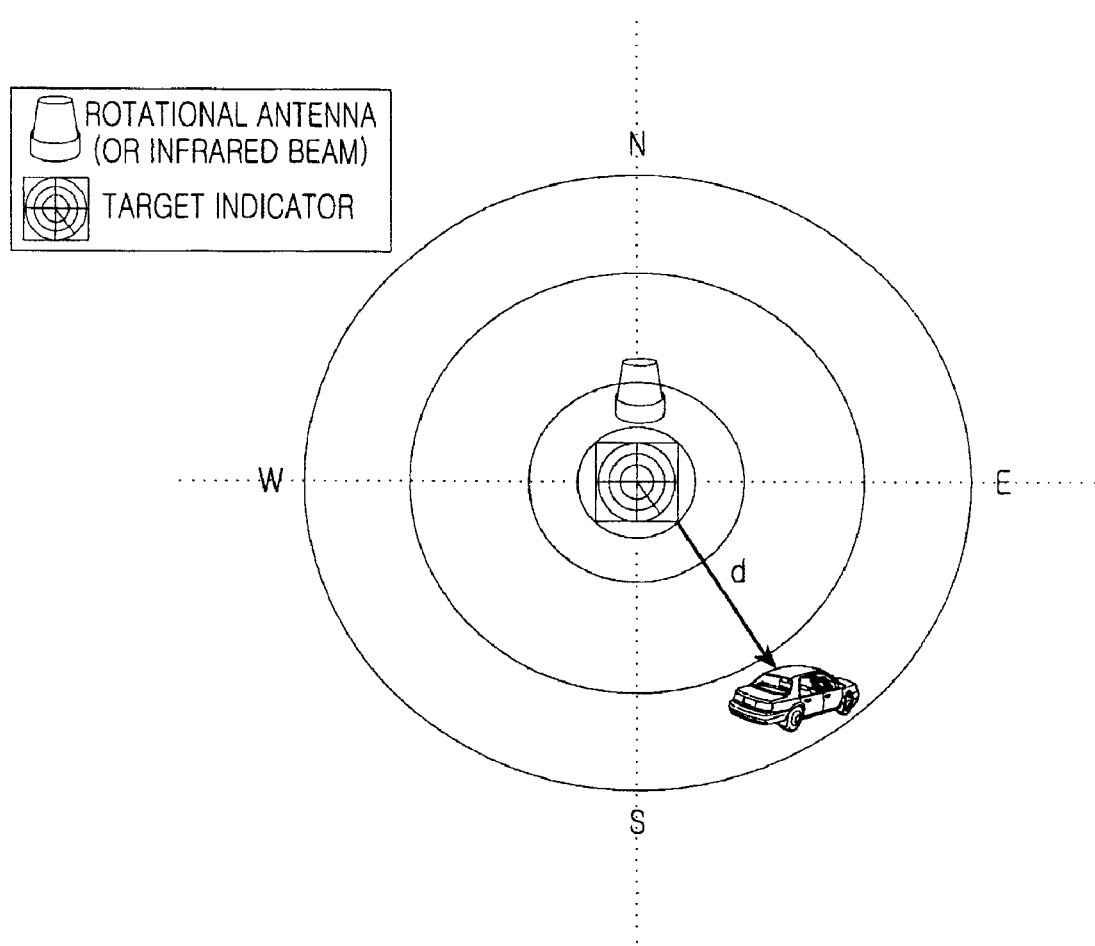
FIG. 1 illustrates a conventional method for tracking the location of a target object indoors by infrared rays.
Figure 2:
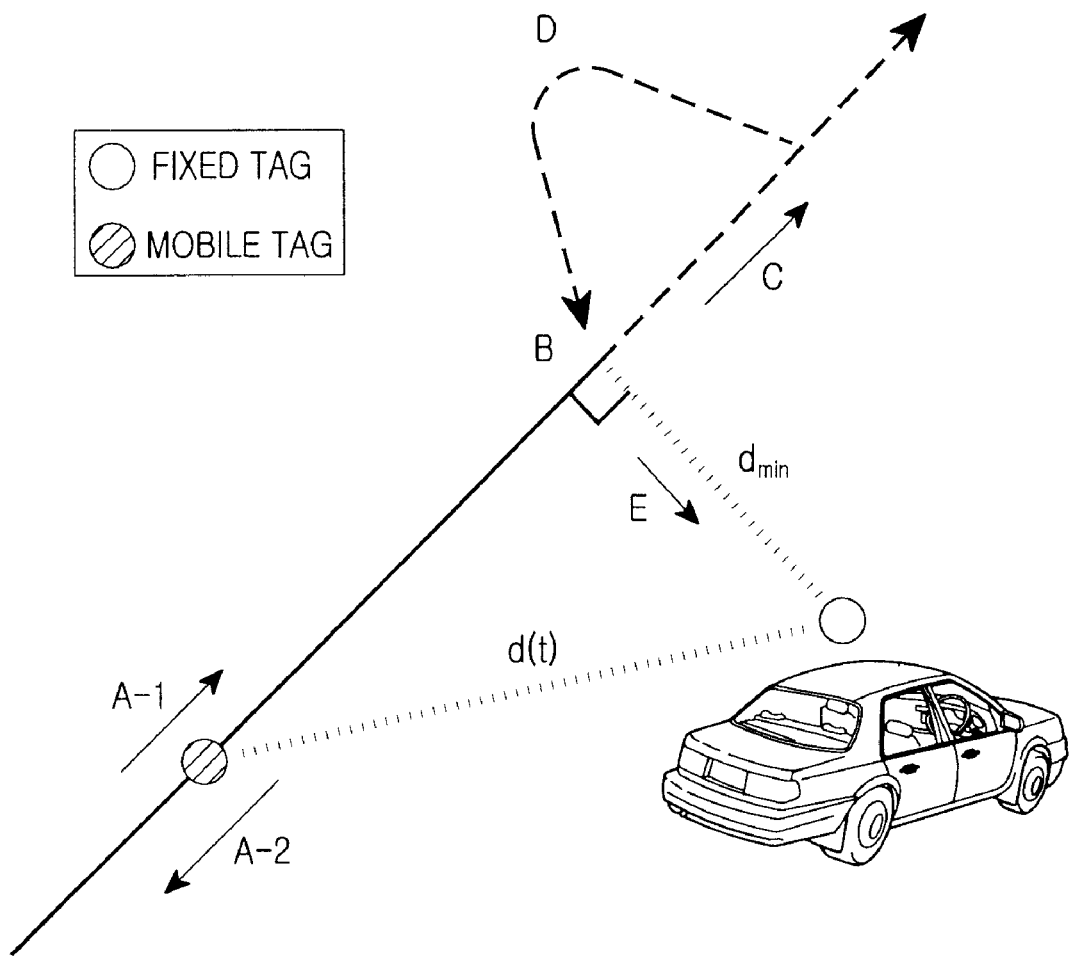
FIG. 2 illustrates exemplary operation of a method for tracking the location of a target object indoors using a wireless distance measuring technology according to an exemplary embodiment of the present invention.

FIG. 2 illustrates a method for tracking the location of a target object indoors using a wireless distance measuring technology according to an exemplary embodiment of the present invention. Referring now to FIG. 2, a fixed tag (indicated by the clear circle) is attached to a parked car and a mobile tag (indicated by the shaded circle) is attached to a location tracking apparatus for performing logical computations with mobility, like a portable terminal or a robot. The distance between the two tags is measured, for example, by measuring the ToA of signals between them.

Still referring to FIG. 2, "d(t)" denotes a measured distance between the fixed tag and the mobile tag, which changes over time t. The value "$d_{min}$" denotes the minimum value of d(t), i.e. from the geometrical perspective, the distance between the two tags measured by drawing a perpendicular line from the fixed tag to the traveling line of the mobile tag.

In addition, "A-1" and "A-2" denote opposite directions starting from the same point, and "B" denotes a location where the distance between the mobile tag and the fixed tag is the minimum, $d_{min}$.

Still referring to FIG. 2, "C" denotes a path along which the mobile tag travels to make a "P-turn" counterclockwise, when it passes the target. The length of the path C can be initially set to an appropriate value "$d_c$".

"D" denotes a path along which the mobile tag takes the P-turn counterclockwise according to $d_c$. "E" denotes a path which the mobile tag takes from the path D according to the change of d(t) and along which it reaches the target.

Figure 3:
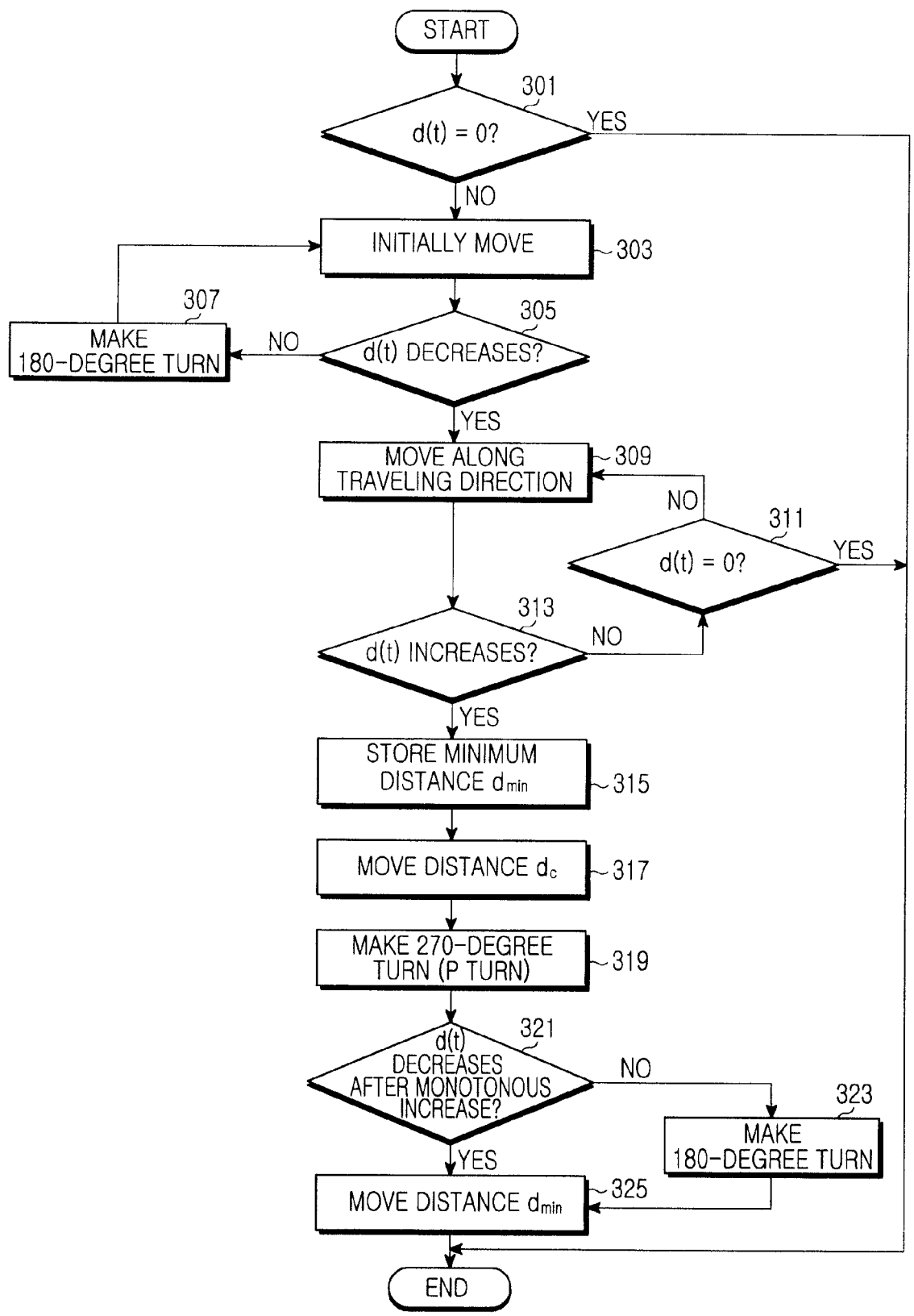
FIG. 3 is a flowchart further illustrating the method for tracking the location of a target object indoors using a wireless distance measuring technology according to the exemplary embodiment of the present invention.

FIG. 3 is a flowchart illustrating exemplary operation of a method for tracking the location of a target object indoors using a wireless distance measuring technology according to an exemplary embodiment of the present invention.

Referring now to FIG. 3, it is determined whether or not a distance d(t) measured between the fixed tag and the mobile tag, which changing in time t, is 0 (step 301). If d(t) is 0, which implies that the fixed tag is not apart from the mobile tag, the procedure ends. If d(t) is not 0, the location tracking apparatus with the mobile tag attached thereto initially moves (step 303).

In step 305, it is determined whether or not the location tracking apparatus is initially directed forward or backward depending on whether d(t)<d(t−1). In other words, it is determined whether or not d(t) decreases. If d(t)>d(t−1), that is, d(t) increases, then the location tracking system is initially directed backward with respect to the target as indicated by A-2 in FIG. 2. Therefore, the location tracking apparatus rotates at 180 degrees and then moves again in step 307. On the contrary, if d(t)<d(t−1), in other words, if d(t) decreases, the location tracking apparatus is initially directed forward with respect to the target as indicated by A-1 in FIG. 2. Hence, the location tracking apparatus continues its movement in step 309.

In step 309, d(t) is preferably monitored at every predetermined interval during the movement of the location tracking apparatus. First, it is determined whether d(t) is 0. If the location tracking apparatus reaches a location where d(t) is 0, which implies that the target has been located, i.e. the fixed tag and the mobile tag are not apart from each other, and the procedure ends. If d(t) is not 0, it is determined whether d(t) increases. If d(t)>d(t+1), i.e. d(t) decreases, the location tracking apparatus has not passed the target yet. Hence, steps 309 through 313 are repeated until d(t) increases. If d(t) is 0 during the repeated operation, the procedure ends. If d(t)<d(t+1), (i.e. d(t)) decreases and then increases in step 313, this means that the location tracking apparatus has passed the target. Thus, the minimum distance $d_{min}$ between the mobile tag and the fixed tag is detected as in a location as indicated by B in FIG. 2 and stored in step 315.

If the location tracking apparatus subsequently passes the target, it travels along a path of length $d_c$ to make a P-turn counterclockwise like the path C in FIG. 2 in step 317 and is directed toward the target by making a 270-degree P turn or three 90-degree turns as in the path D of FIG. 2.

As described above, $d_c$ can be set to an arbitrary value so that the location tracking apparatus can go to the location corresponding to $d_{min}$ by a P-turn or by three 90-degree turns. The location tracking apparatus moves to a location where it is supposed to take a P-turn or three 90-degree turns according to $d_{min}$, the distance between a current location and the location corresponding to $d_{min}$, and $d_c$. It is assumed herein that the location tracking apparatus turns counterclockwise in step 319. However, a person of ordinary skill in the art should understand and appreciate that the invention as defined in the claims is not limited to counterclockwise turning.

Still referring to FIG. 3, in step 321, d(t) is monitored during the P-turn. If d(t) decreases after a monotonous increase, which implies that the fixed tag attached to the target is on the right with respect to the original traveling direction of the location tracking apparatus, the location tracking apparatus moves straight ahead for the distance $d_{min}$ without any turn at the location B after the P-turn along the path D of FIG. 2 and then reaches the target in step 325. On the other hand, if d(t) increases after a monotonous decrease, which implies that the fixed tag attached to the target is on the left with respect to the original traveling direction of the location tracking apparatus, the location tracking apparatus takes a 180-degree turn at the location B after the P-turn along the path D of FIG. 2, moves straight ahead for the distance $d_{min}$, and then reaches the target in step 323.

The rotating direction of the location tracking apparatus can be set freely and d(t) changes differently according to the rotating direction.

The above-described location tracking method is applicable but not limited to an accurate distance measuring technology based on the wireless physical layer of, for example, Institute of Electrical and Electronics Engineers (IEEE) 802.15.4a. The location tracking method enables the location tracking apparatus to approach a target directly by use of two wireless distance measurers without the need of such equipment as fixed reference nodes.

As is apparent from the above description, the present invention can advantageously track down a fixed target with minimum system resources using two accurate wireless distance measurers without using reference nodes or a sensor system in an indoor environment.

While the invention has been shown and described with reference to a certain exemplary embodiment of the present invention thereof, it will be understood by those skilled in the art that various changes in form and details may be made therein without departing from the spirit and scope of the present invention as defined by the appended claims and their equivalents.

What is claimed is:

1. A method for sensorless tracking of an indoor target using a wireless distance measuring technology, said method comprising:
   initially moving a location tracking apparatus;
   determining whether an initial traveling direction of the location tracking apparatus is forward or backward with respect to a target, wherein said initial travel direction is determined according to change in a distance measurement between the location tracking apparatus and the target;
   determining a minimum distance and corresponding location between the location tracking apparatus and the target as movement proceeds along the initial travel direction;
   storing the minimum distance and corresponding location;
   moving a predetermined distance past the location corresponding to the minimum distance;
   making one of a P-turn and three 90-degree turns to move the location tracking apparatus to the location corresponding to the minimum distance;
   determining whether the location tracking apparatus is directed forward or backward with respect to the target at the location corresponding to the minimum distance; and
   adjusting the direction of travel to cause the location tracking apparatus to move toward the target.

2. The method of claim 1, a plurality of distances between the location tracking apparatus and the target are stored in an order of time.

3. The method of claim 1, wherein wireless distance measurers are provided in a fixed tag and a mobile tag for measuring a Time of Arrival (ToA) of signals between the fixed tag and mobile tag.

4. The method of claim 3, wherein the fixed tag is attached to the target and the mobile tag is attached to the location tracking apparatus.

5. The method of claim 1, wherein determining the initial traveling direction determination comprises:
   (i) comparing a previous distance d(t−1) and a current distance d(t) between the location tracking apparatus and the target, the previous distance d(t−1) and the current distance d(t) being stored in the order of time;
   (ii) determining that the traveling direction of the location tracking apparatus is forward, if current distance d(t) is less than previous distance d(t−1); and
   (iii) determining that the traveling direction of the location tracking apparatus is backward, if current distance d(t) is larger than previous distance d(t−1).

6. The method of claim 1, wherein the minimum distance determination comprises:
   analyzing changes of distances measured over a predetermined period of time between the location tracking apparatus and the target during the movement of the location tracking apparatus.

7. The method of claim 1, further comprising ending the target tracking if the distance between the location tracking apparatus and the target is 0.

8. The method of claim 1, wherein adjusting the direction of travel of the location tracking apparatus to the target comprises:

performing one of:

moving the location tracking apparatus in a straight line if a distance between the location tracking apparatus and the target decreases; and turning the location tracking apparatus 180 degrees and moving the location tracking apparatus straight as the distance between the location tracking apparatus and the target decreases.

9. A system for tracking an indoor target using a wireless distance measuring technology, comprising:

a location tracking apparatus for tracking a location of a fixed tag using distances between a mobile tag and the fixed tag, the distances being stored at predetermined periods of time, said apparatus:

determining a minimum distance and corresponding location as an inflection point of decreasing then increasing distances to the target, returning to the location corresponding to the minimum distance by one of a P-turn or three 90 degree turns after traveling a known distance past the location of minimum distance; and moving toward the target by decreasing a distance between the apparatus and the target; and a target to which the fixed tag is attached.

10. The system of claim 9, wherein if a distance between the mobile tag and the fixed tag is 0, the location tracking apparatus ends the location tracking.

11. The system of claim 9, wherein wireless distance measurers are provided in the fixed tag and the mobile tag for measuring a Time of Arrival (ToA) of signals between the fixed tag and mobile tag.

12. The system of claim 9, wherein the fixed tag is attached to the target and the mobile tag is attached to the location tracking apparatus.

13. The system of claim 12, wherein the fixed tag is attached to a parked car.

14. The system of claim 11, wherein the fixed tag is attached to a robot paging remote controller.

* * * * *